April 22, 1952

D. P. RODDIN ET AL
METHOD OF MAKING A TELEGRAPHIC
FACSIMILE TRANSMITTING BLANK
Filed Nov. 26, 1948

2,593,923

INVENTORS
D. P. RODDIN
B. L. KLINE
BY
[signature]
ATTORNEY

Patented Apr. 22, 1952 2,593,923

UNITED STATES PATENT OFFICE 2,593,923

METHOD OF MAKING A TELEGRAPHIC FACSIMILE TRANSMITTING BLANK

Daniel P. Roddin, Brooklyn, and Bernard L. Kline, Manhasset, N. Y., assignors to The Western Union Telegraph Company, New York, N. Y., a corporation of New York Application November 26, 1948, Serial No. 62,184

1 Claim. (Cl. 117—45)

This invention relates to the telegraphic facsimile transmission of messages from a subject matter blank by means of an electrical stylus which scans the blank, and more particularly to a facile and inexpensive method for enabling a conventional type of receiving facsimile blank also to be used as a transmitting blank for generating facsimile signals.

In order to make facsimile telegraph service more available to private firms and business houses at a reasonable cost, it is necessary that the facsimile sending and receiving apparatus in the patron's offices be simple in construction, low in cost, and capable of use with a minimum of training and experience on the part of the office force. To further simplify such service, it is highly desirable to avoid having to keep supplies of different kinds of blanks in a patron's office for transmitting and receiving purposes, respectively.

Moreover, in a transmitting blank on which a message is written by means of carbon impressions produced by the force or impact of writing or typing on a carbon or other transfer sheet superimposed on the blank, there is a pressure gradient from the center portion outwardly to the edge portions of each of the elemental lines or other marks which form an impressed character, thus tending to broaden the character. When transmitting from such a blank heretofore by means of an electrical stylus that scans the conductive and nonconductive areas of the blank, the characters recorded on an electrosensitive blank by a stylus at the receiving station were broader than they should be and lacked the desired fine definition, and the characters sometimes were blurred and hollow characters filled in, since the width of each recorded character was not only the width of the broadened character impressed on the transmitting blank but included approximately twice the width of the transmitting stylus point.

One of the objects of the present invention is to enable a well known type of electrosensitive recording blank to be used satisfactorily both for transmitting outgoing facsimile messages and recording incoming facsimile messages involving either typewritten or hand-written subject matter, and which is capable of use with inexpensive facsimile sending and receiving apparatus and by inexperienced personnel.

Another object is to obtain finer definition and greater detail in the subject matter recorded on an electrosensitive blank in response to incoming facsimile signals generated by an electric stylus that scans relatively conductive and non-conductive areas on a transmitting blank.

Other objects and advantages of the invention will be apparent from the following detailed description of an illustrative form of the invention, taken in connection with the accompanying drawings in which:

Fig. 1 diagrammatically illustrates a send-receive facsimile system suitable for use with transmitting blanks prepared in accordance with the invention;

Figure 1:
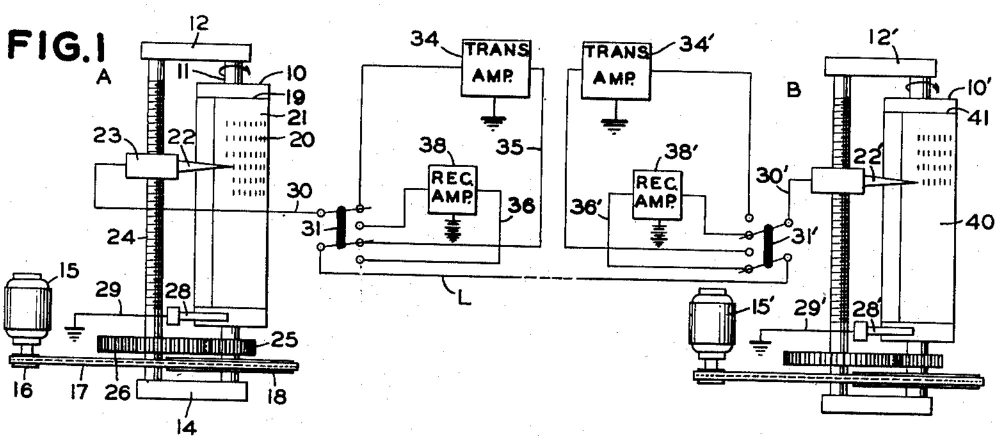

In accordance with the instant invention, a conventional facsimile recording blank having applied thereto a message in the manner later described, operates satisfactorily as an electrical transmitting blank and embodies the advantages hereinbefore referred to. A recording blank of the type suitable for the purpose is described in Kline Patent 2,251,742, issued August 5, 1941, and in Wise Patent 2,294,146, issued August 25, 1942, the disclosures of which are incorporated herein by reference. Such a recording blank comprises a base sheet, usually of paper, which sheet or at least one surface thereof is a good conductor for the facsimile stylus current. This sheet may be made conductive, either by incorporating in the paper pulp, or by impregnating the paper sheet with, a suitable electrolyte or finely divided conducting particles uniformly dispersed throughout the paper. The conductive particles may comprise finely divided carbon, silver or aluminum, and the electrolyte may comprise potassium iodide, sodium nitrate or other suitable compound. Finely divided carbon in the form of graphite is preferred as the conducting substance. The conducting paper sheet has thereon a thin adherent surface coating of a marking pigment which forms the electrosensitive recording surface of the blank, this pigment being suspended in a suitable binder and comprising one or more marking compounds such as lead thiosulphate, titanium oxide, lithopone or others disclosed in the aforesaid patents. By way of example the binder may be one ordinarily employed in the paint or ink industry, such as linseed oil, tung oil, Perilla oil, fish oil, soya bean oil, etc., mentioned in the aforesaid Wise patent, which are water-insoluble organic adhesive binders.

The electrosensitive coating forms the background of the blank, and usually is light gray or white in color, and is used for recording the electrical forces applied by the recording stylus to produce black or dark-colored marks on the light colored surface of the blank to delineate the subject matter represented by the received signals and produce a facsimile record thereof. The marking is effected in selected elemental areas of the blank either by chemical change in the masking pigment of the coating or by blast-off of the pigment to reveal the underlying carbon layer or by movement of the carbon particles to the surface of the coating, or a combination of these effects, under the influence of the electrical forces applied by the stylus to the elemental areas to be marked.

Due to the presence of the distributed carbon or graphite particles or other conductive material embodied in the paper sheet, the only material resistance to the flow of current from the stylus through the sheet is that of the coating itself which, although thin, has a sufficiently high resistance to cause it to act as an insulating surface providing the voltage applied thereto is not sufficiently high to cause breakdown of the coating. When used as a recording blank, the voltage applied by the stylus necessarily is sufficiently high, usually of the order of 300 volts or higher, to effect breakdown of the coating and produce the desired marking effects in selected elemental areas of the blank, whereas when the blank is used as a transmitting blank, in the manner hereinafter set forth, the voltage applied to the transmitting stylus is quite low, for example, from 5 volts to 50 volts; a potential of 5 volts applied to the stylus has been found to be satisfactory for transmitting. Either alternating current or direct current may be used for transmitting and recording.

Referring now to Fig. 1 of the drawings, there is illustrated simple and inexpensive facsimile apparatus at stations A and B interconnected by a transmission line L. Station A may be located, for example, in a patron's office, and station B either at another patron's office or it may represent the receiving position of a telegraph company which retransmits the received message over commercial lines to its destination. As shown, the facsimile units at the two stations may be identical, and each is adapted both for transmitting and receiving messages by electrical pickup and electrical recording methods respectively. Each of the facsimile units comprises a transmitting and recording metallic cylinder or drum 10 carried by a centrally disposed driving shaft 11 which is journalled in frame members 12 and 14. In transmitting and receiving signals the cylinder is rotated, in the direction indicated by the arrow, by any suitable means such as an electric motor 15, preferably of the alternating current synchronous type, which is connected in the illustrative form shown by a driving pulley 16 and a belt 17 to a driven pulley 18 keyed to the shaft 11. To prevent slippage, the pulleys have pins thereon which are received in slots in the belt, as indicated.

The characters or images 20 comprising the subject matter, such as a telegram, to be transmitted, are impressed by means of a conductive substance hereinafter disclosed, on the surface 21 of a recording sheet 19 of the type hereinbefore referred to, after which the sheet is wrapped once around the metallic cylinder 10 in the manner shown in the figure and releasably secured to the cylinder in any desired manner, as by elastic retaining bands such as disclosed in Patent No. 2,255,868, issued September 16, 1941. A scanning electrode or metal stylus 22, whose point bears on the surface of the paper sheet 21 with a pressure usually of 8 to 10 grams, is supported by a travelling carriage 23 adapted for movement longitudinally along a rotatable shaft 24 screw-threaded throughout the greater part of its length, the shaft being rotated by driving gears 25 and 26 keyed to the shafts 11 and 24, respectively, whenever the cylinder is rotated. Thus, the stylus 22 is caused to traverse the cylinder in a longitudinal direction as the cylinder rotates, the pitch of the thread on the shaft 24 determining the extent of longitudinal traverse of the stylus during each rotation of the cylinder and hence the number of scanning lines per inch. In this manner the stylus point will describe a helical path as it moves over the surface of the telegraph blank and thus produce a scanning action.

After the blank has been scanned, it is taken off the cylinder and another blank placed thereon either for sending another telegram or for receiving a telegram, means being provided whereby the traveling carriage 23 may be manually returned to its starting position. The foregoing method of obtaining a scanning movement per se is well known, as are various other methods of electrically scanning a given field in facsimile transmission systems, and it is to be understood that any of the known methods of scanning by means of an electric stylus and suitable for the purpose may be employed in lieu of the foregoing method described.

The metallic cylinder 10 is electrically insulated from its associated apparatus, the electrical connection to the cylinder being made by means of a stationary brush or other contact member 28 which bears against the cylinder and electrically connects the cylinder to the ground leg of the signal circuit. The metallic leg 30 of the signal circuit is connected to the scanning stylus 22 which remains in contact with the surface of the transmitting sheet. A double pole double throw switch 31 when in its upper, or transmitting, position as shown, connects the leg 30 to a transmitting amplifier 34 for raising the signal level to any desired value. The signals in the output of the amplifier are transmitted over a circuit comprising conductor 35, switch 31, transmission line L, switch 31' at station B, and conductor 36' to the receiving amplifier 38' where the signals are amplified and applied, by means of the switch 31', conductor 39', and electrical stylus 22', to the surface 40 of an electrosensitive recording blank 41. When synchronism of the rotating parts at stations A and B is properly maintained in any of the various ways known in the art, the message or image upon the blank 19 will be reproduced in facsimile upon the receiving blank 41 as scanning proceeds. The receiving amplifier 38' which amplifies the received signals to a suitable level causes marking potential of the proper value to be applied intermittently by the stylus 23 to properly mark the electrosensitive recording blank 41.

When it is desired to transmit from station B to station A, a transmitting blank such as the blank 19 is placed on the drum 10' at station B, and a recording blank such as 41 is placed on the drum of station A; the switch 31 is thrown to its lower, or receiving, position and switch 31′ to its upper, or transmitting, position. Transmission from station B and reception at station A involves the same operations as above described with respect to transmission from the opposite direction, the apparatus at the two stations being identical.

Instead of employing direct current circuits for transmission over line L, it is to be understood that the signals generated at the station which is transmitting may be used to modulate a carrier current in known manner for transmission of the signals between the stations, in which case a two-conductor metallic circuit preferably will be employed between the stations.

Figures 2, 3, 4:
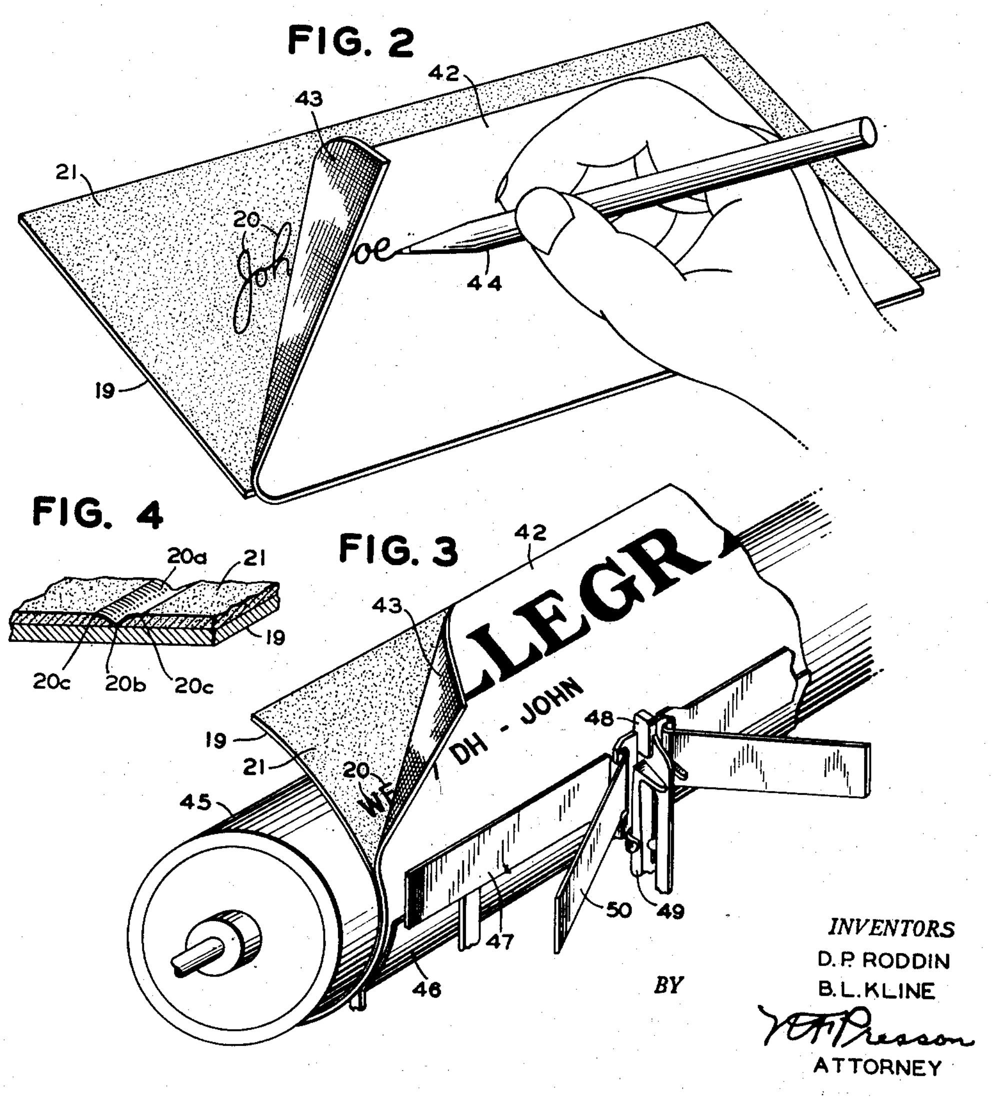
Fig. 2 shows the preparation of a hand-written message on a transmitting blank of the character disclosed herein.
Fig. 3 shows a preparation of a typewritten message on the transmitting blank.
Fig. 4 is an enlarged fragmentary view of a small area of such a blank.

Fig. 2 illustrates how a handwritten blank embodying the invention may be prepared. Sheet 19 with its electrosensitive recording surface 21 is a conventional recording blank of the character above described. On the blank is superimposed a special transfer sheet 42 having on its under surface a coating 43 of a conducting transfer substance comprising graphite. When a message is written, as by means of a stylus or pencil 44, on the surface of the sheet 42, as illustrated in the drawing, the pressure exerted causes a very thin layer of the conducting graphite material 43 to be transferred to the surface 21 of the blank 19 to form the characters 20 of the message thereon. When a proper voltage is applied to the transmitting stylus the pigment comprising the background of the blank forms an insulating layer and the transferred graphite characters form conducting areas, so that the transmitting stylus scans relatively conductive and nonconductive elemental areas of the transmitting blank to produce signals in accordance therewith. Fig. 3 is a fragmentary view of a typewriter in which the sheets 19 and 42 are inserted, the sheets passing between the typewriter platen 45 and a paper guide 46 and a line guide 47. The conductive characters 20 are impressed on the insulating surface 21 of the sheet 19 as the letters or characters of the telegram or other message are struck by the type bars 48 which pass between a typewriter bar guide member 49 to strike a conventional typewriter ribbon 50 against the sheet 42 and impress thereon the characters carried by the type bars. The resultant conducting characters are impressed on the surface 21 of the blank 19 to cause facsimile signals to be generated and transmitted in the manner described above with respect to Figs. 1 and 2.

The fine definition obtained when employing a blank of the character disclosed herein had been amply proved in practice, and the theory upon which this depends appears to be as follows, although we do not wish to be limited to the precise theory involved. Fig. 4 is an enlarged fragmentary view of a small area of a blank, showing how a conducting character 20 impressed on the surface 21 of the blank coacts with the underlying conductive sheet 19 to produce facsimile signals. The thickness of the conducting sheet 19, and also the thickness of the adhering surface coating 21 and that of the conductive layer 20*a* of the character impressed on the surface coating is exaggerated in order to illustrate more clearly the principle involved. In practice, the underlying paper sheet 19 has a thickness usually of .002 to .003 inch; the thickness of the coating 21 is from .0008 to .0015 inch; and the layer 20*a* of the impressed character 20 is much thinner than the coating 21, thereby resulting in a very thin conducting character.

The elemental mark comprising the area 20*a* of graphite material impressed on the surface of the coating of the blank may, for purposes of illustration, be assumed to represent a portion of a mark or line embodied in a typed or handwritten character. It will be seen that only approximately the center portion 20*b* of the mark has been forced through the coating 21 to closely approach or contact the underlying conductive sheet 19. The pressure exerted by the pencil 44 or type 48 causes the surface of the mark to extend to the outer edge portions 20*c*, which tends to broaden the character as hereinbefore stated. However, since the pressure gradient diminishes from the central portion outwardly to the edge portions, the edge portions have not been forced through the coating 21 and the resistance path between the edge portions and the conducting sheet 19 is so high that no significant signal is generated by the transmitting stylus except when it is in contact with approximately the central portion 20*b* of the elemental mark embodied in the impressed character. It may be that the graphite particles in the very thin edge portions comprise a discontinuous path so far as any appreciable conductivity is concerned, although to the eye the impressed character appears continuous in its extent. In any event the electrical resistance of the path through the edge portions, either directly through the coating 21 to the conducting paper 19 or laterally through the edge portions to the central portion 20*b*, is sufficiently high to cause an effective transmitting signal to be produced only from the central portion, and hence the characters recorded at the receiving station are not as broad as the impressed characters on the transmitting blank and the definition of the recorded characters is sharper and clearer than that obtained by other methods of stylus transmission, and hollow characters are not filled in.

The graphite material comprising the transfer coating 43 and also the impressed characters 20 are not deleteriously affected by moisture or conditions of high humidity under which the transfer sheet 42 may at times be used, since the graphite is dispersed in a hydrophobic carrier medium. The following formula represents an example of a transfer material suitable for the coating 43 and resulting in impressed characters having the features above set forth:

| | | |
|---|---|---|
| 50% graphite dispersion | parts by weight | 25 |
| Microcrystalline wax, 155°–160° F. melting point | parts by weight | 4 to 5 |
| Petrolatum | do | 5 to 6 |
| Thinner (benzol, toluol, carbon tetrachloride or the like) | parts by volume | 60 to 80 |

The 50% graphite dispersion in the foregoing formula may be a colloidal dispersion comprising 50% of graphite and 50% of a hydrocarbon vehicle such as toluol or an aromatic naphtha, and commercially called "Dag No. 22"; other similar graphite dispersions commercially known as "Dag No. 38" and "Dag No. 47" are also suitable. Also, powdered graphite may be used in place of the commercial "Dag" dispersions and other kinds of wax mediums may be used as alternatives in the formula.

Another illustrative formula having a lower cost, and which is somewhat more flexible in use, comprises a dispersion of carbon black in a solution of nitrocellulose, cellulose acetate, or other resin which has been highly plasticized with a non-volatile plasticizer such as tricresyl phosphate, dibutyl phthalate, castor oil, triacetin, or triphenyl phosphate. Such a formula is:

| | Parts by weight |
|---|---|
| Nitrocellulose (high viscosity) | 5 |
| Tricresyl phosphate | 19 |
| Carbon black | 7 |
| Acetone or ethyl acetate | 30 |

In the illustrated embodiment of the invention the entire body of the blank 19 is made conductive, but if desired only the surface need be conductive. This may be obtained by coating the sheet 19 with a suitable conducting layer incorporated in a suitable binder, for example, synthetic resins commonly used in lacquers, such as cellulose nitrate, or water soluble materials such as casein, starch and polyvinyl alcohol. Where the body 19 of the blank is nonconducting, the electrode 28 shown in Fig. 1 is in contact with the marginal edge of the conductive surface of the transmitting blank instead of being in contact with the metallic drum 10, thereby to complete the stylus circuit.

As hereinbefore set forth, the composition of the marking pigment 21 is insulating in character when suitable voltages are used in the transmitting stylus circuit. However, even though the pigment should be conductive to some extent, if the conductivity of the central portions of the impressed conductive characters is substantially higher than that of the coating 21, the transmitting stylus pickup circuit can distinguish between the marked and unmarked areas of the transmitting blank and thus cause proper signals to be generated for controlling the transmitting circuit.

Various other substances having properties similar to those of the substances specifically mentioned herein for forming the conductive characters or other component parts of the subject matter of the transmitting blank, and various other embodiments of the invention, will appear to those skilled in the art and therefore the particular substances and embodiments disclosed herein are to be considered in an illustrative sense rather than in a limiting sense.

What is claimed is:

The method of preparing a facsimile message transmitting blank embodying a conductive base sheet having thereon a thin adherent surface coating of a decomposable insulating facsimile recording pigment suspended in a water-insoluble organic adhesive binder selected from the class consisting of linseed oil, tung oil, Perilla oil, fish oil and soya bean oil, the amount of pigment present in said coating being sufficient to mask the underlying conductive base sheet, the thickness of said coating being not greater than approximately .0008 to .0015 of an inch, and adapted to be scanned by an electrical stylus of a facsimile transmitter, which comprises superimposing upon the insulating surface coating of the blank a transfer sheet having a coating of graphite dispersed in a waxy vehicle, the amount of graphite by weight being at least as much as that of the waxy vehicle in said dispersion, and applying sufficient pressure to selected elemental areas of the transfer sheet to cause a small amount of the graphite dispersion to be transferred to and embedded in corresponding elemental areas of the insulating surface coating of the blank to a depth such that it is substantially in contact with the underlying conductive base sheet to delineate by elemental conducting areas of said graphite dispersion embedded in an insulating background the subject matter to be transmitted.

DANIEL P. RODDIN.
BERNARD L. KLINE.

REFERENCES CITED

The following references are of record in the file of this patent:

UNITED STATES PATENTS

| Number | Name | Date |
|---|---|---|
| 1,864,097 | Sherman | June 21, 1932 |
| 1,865,708 | Sherman | July 5, 1932 |
| 2,181,533 | Kline | Nov. 28, 1939 |
| 2,228,280 | Maddock | Jan. 14, 1941 |
| 2,294,146 | Wise | Aug. 25, 1942 |
| 2,398,779 | Dalton | Apr. 23, 1946 |